(12) United States Patent
Hou

(10) Patent No.: US 7,876,128 B1
(45) Date of Patent: Jan. 25, 2011

(54) VOLTAGE SEQUENCE OUTPUT CIRCUIT

(75) Inventor: Chuan-Tsai Hou, Taipei Hsien (TW)

(73) Assignee: Hon Hai Precision Industry Co., Ltd., Tu-Cheng, Taipei Hsein (TW)

( * ) Notice: Subject to any disclaimer, the term of this patent is extended or adjusted under 35 U.S.C. 154(b) by 0 days.

(21) Appl. No.: 12/813,475

(22) Filed: Jun. 10, 2010

(30) Foreign Application Priority Data

Apr. 21, 2010 (CN) .................................. 09 9 11255

(51) Int. Cl.
*H03K 19/02* (2006.01)
*H02J 1/00* (2006.01)
*H02J 3/14* (2006.01)

(52) U.S. Cl. ..................... 326/57; 326/90; 713/330; 307/41

(58) Field of Classification Search .................. 326/56, 326/57, 62, 89, 90; 713/330; 307/41, 38
See application file for complete search history.

(56) References Cited

U.S. PATENT DOCUMENTS 5,646,548 A * 7/1997 Yao et al. ....................... 326/80

FOREIGN PATENT DOCUMENTS

JP       2009188531 A *  8/2009

* cited by examiner

*Primary Examiner*—Daniel D Chang
(74) *Attorney, Agent, or Firm*—Zhigang Ma

(57) ABSTRACT

A voltage sequence output circuit includes a sequence control circuit and a number of voltage output circuits. The sequence control circuit includes a first NOR gate, and the first NOR gate includes a number of the input terminals. The voltage output circuits each includes an input terminal, an output terminal, and a positively enabled tristate buffer connected between the input terminal and the output terminal thereof. The input terminals of the voltage output circuits is connected to the input terminals of the first NOR gate. If all of input terminals of the voltage output circuits are connected with electronic devices, the positively enabled tristate buffer of the voltage output circuits are enabled. The output terminals of the voltage output circuits sequentially output a voltage.

7 Claims, 2 Drawing Sheets

VOLTAGE SEQUENCE OUTPUT CIRCUIT

BACKGROUND

1. Technical Field

The present disclosure relates to voltage output circuits and, particularly, to a voltage sequence output circuit capable of sequentially triggering electronic devices.

2. Description of Related Art

As a number of loads that are coupled to one circuit are powered simultaneously, the circuit may be prone to be damaged by instantaneous high voltage at the initial moment. Accordingly, various voltage sequence output circuits are designed for sequentially triggering of the loads to limit the initial voltage of the loads and to improve the reliability of the circuits. However, traditional voltage sequence output circuits typically include a very expensive integrated circuit chip such as a control chip, thereby increase the cost of the circuits.

Therefore, it is desirable to provide a voltage sequence output circuit which can overcome the limitations described above.

DETAILED DESCRIPTION

Embodiments of the disclosure are now described in detail, with reference to the accompanying drawings.

Figure 1:
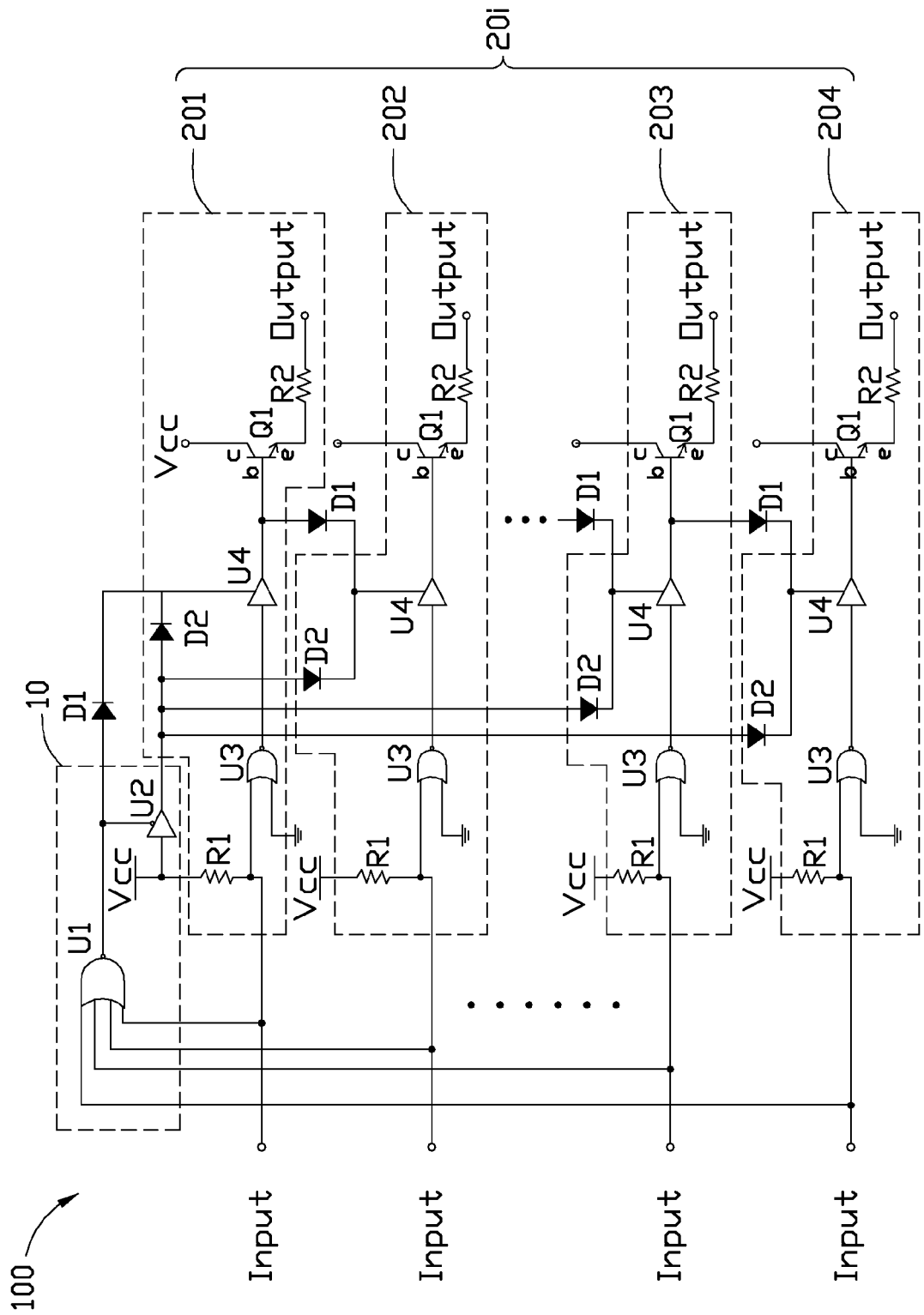
FIG. 1 is a circuit diagram of a voltage sequence output circuit, according to an exemplary embodiment.

Referring to FIG. 1, a voltage sequence output circuit 100, according to an exemplary embodiment, is configured for sequentially triggering electronic devices (not shown). An electronic device to be triggered includes a grounded terminal and a power terminal. The voltage sequence output circuit 100 includes a sequence control circuit 10, a number of voltage output circuits 20$i$, and a number of first diodes D1.

The sequence control circuit 10 further includes a first NOR gate U1 and a negatively enabled tristate buffer U2. The first NOR gate U1 includes a number of input terminals and a negative output terminal. If and only if all of the input terminals of the first NOR gate U1 receive a low level signal (e.g., logical "0"), will the negative output terminal outputs a high level signal (e.g., logical "1"); otherwise, the negative output terminal outputs a low level signal. The negatively enabled tristate buffer U2 includes an input terminal coupled to a power source Vcc, an output terminal, and a negatively enabled terminal coupled to the negative output terminal of the first NOR gate U1. If the negatively enabled terminal of the negatively enabled tristate buffer U2 is inputted a low level signal, the negatively enabled tristate buffer U2 is enabled; otherwise, the negatively enabled tristate buffer U2 is cutoff.

Each the voltage output circuit 20$i$ includes an input terminal INPUT and an output terminal OUTPUT. The voltage output circuits 20$i$ are balanced by the input terminals of the first NOR gate U1. The input terminal INPUT of the voltage output circuit 20$i$ is coupled to the input terminal of the first NOR gate U1.

Each of voltage output circuits 20$i$ includes a second NOR gate U3, a first resistor R1, a positively enabled tristate buffer U4, a second diode D2, a transistor Q1, and a second resistor R2. The second NOR gate U3 includes a first input terminal coupled to the input terminal INPUT of the voltage output circuit 20$i$, a second input terminal being grounded, and a negative output terminal. When the first input terminal of the second NOR gate U3 receives a low level signal, the negative output terminal will output a high level signal. The first resistor R1 includes a first terminal coupled to the first input terminal of the second NOR gate U3 and a second terminal coupled to the power source Vcc. The positively enabled tristate buffer U4 includes an input terminal coupled to the negative output terminal of the second NOR gate U3, an output terminal, and a positively enabled terminal. When the positively enabled terminal of the positively enabled tristate buffer U4 receives a high level signal, the input terminal and the output terminal of the positively enabled tristate buffer U4 are connected with each other; otherwise, the input terminal and the output terminal of the positively enabled tristate buffer U4 are cutoff. The second diode D2 includes an anode coupled to the positively enabled terminal of the positively enabled tristate buffer U4 and a cathode coupled to the output terminal of the negatively enabled tristate buffer U2. The transistor Q1 is an NPN type, and includes a collector "c" coupled to the power source Vcc, an emitter "e" coupled to the output terminal OUTPUT of the voltage output circuit 20$i$ via the second resistor R2, and a base "b" coupled to the output terminal of the positively enabled tristate buffer U4.

In the present embodiment, the voltage sequence output circuit 100 includes a first voltage output circuit 201, a second voltage output circuit 202, ..., an ith voltage output circuit 203, and an i+1th voltage output circuit 204. It is noteworthy that the number of the voltage output circuits 20$i$ can be different from the electronic devices.

The anode of one first diode D1 is coupled to the negative output terminal of the first NOR gate U1, and the cathode of this first diode D1 is coupled to the positively enabled terminal of the positively enabled tristate buffer U4 of the first voltage output circuit 201. The anode of another first diode D1 is coupled to the output terminal of the positively enabled tristate buffer U4 of the first voltage output circuit 201, and the cathode of this first diode D1 is coupled to the positively enabled terminal of the positively enabled tristate buffer U4 of the second voltage output circuit 202. The connection between the ith voltage output circuit 203 and the adjacent i+1th voltage output circuit 204 is the same as the connection of the first voltage output circuit 201 and the second voltage output circuit 202 as described above.

In the present embodiment, the voltage sequence output circuit 100 includes four voltage output circuits 20$i$, and the first NOR gate U1 includes four input terminals. When one of the voltage output circuits 20$i$ is connected to an electronic device, the input terminal INPUT and the output terminal OUTPUT are coupled to the grounded terminal and the power terminal of the electronic device respectively. When the grounded terminal of the electronic device is at a low level, the input terminal INPUT of the voltage output circuit is also at a low level. If one of the input terminals of the first NOR gate U1 is at a low level and other input terminal of the first NOR gate U1 are at a high level, the negative output terminal of the first NOR gate U1 outputs a low level signal. The negatively enabled terminal of the negatively enabled tristate buffer U2 is at a low level, while the input terminal and the output terminal of the negatively enabled tristate buffer U2 are connected. The output terminal of the negatively enabled tristate buffer U2 outputs a high level signal. The second diode D2 is enabled and the positively enabled terminal of the positively enabled tristate buffer U4 is at a high level, then the input terminal and the output terminal of the positively enabled tristate buffer U4 are connected. When the first input terminal of the second NOR gate U3 is at a low level, the negative output terminal of the second NOR gate U3 outputs a high level signal. The output terminal of the positively enabled tristate buffer U4 outputs a high level signal to the base "b" of the transistor Q1, then both the collector "c" and the emitter "e" of the transistor Q1 are connected. The emitter "e" of the transistor Q1 outputs a high level signal to the output terminal OUTPUT of the current voltage output circuits 20i via the second resistor R2.

When two or three the four voltage output circuits 20i are connected with the electronic devices, the negative output terminal of the first NOR gate U1 also outputs a low level signal. The output terminals OUTPUT of the voltage output circuits 20i connected to the electronic devices respectively output a high level signal to trigger the electronic devices.

Figure 2:
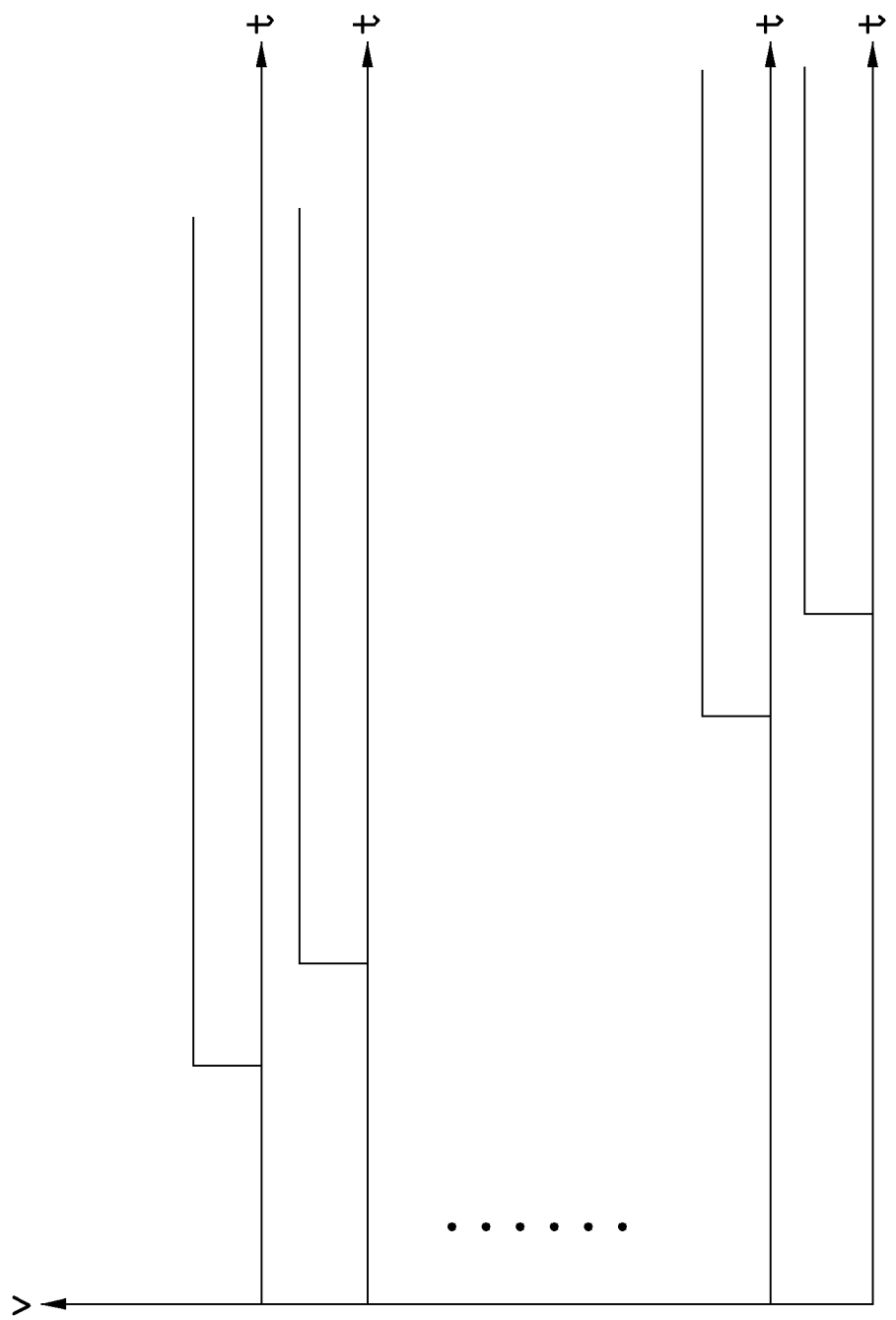
FIG. 2 is a sequence diagram of voltage outputting from the voltage sequence output circuit of FIG. 1.

Referring to FIG. 2, when all of the four voltage output circuits 20i are connected with the electronic devices, the negative output terminal of the first NOR gate U1 outputs a high level signal. When the negatively enabled terminal of the negatively enabled tristate buffer U2 is at a high level, the input terminal and the output terminal of the negatively enabled tristate buffer U2 are cutoff. The first diode D1 connected between the sequence control circuit 10 and the first voltage output circuit 201 outputs a high level signal to the positively enabled terminal of the positively enabled tristate buffer U4 of the first voltage output circuit 201. The input terminal and the output terminal of the positively enabled tristate buffer U4 are connected. When the first input terminal of the second NOR gate U3 is at a low level, the negative output terminal of the second NOR gate U3 outputs a high level signal. The output terminal of the positively enabled tristate buffer U4 also outputs a high level signal to the base "b" of the transistor Q1 and the first diode D1 connected between the first voltage output circuit 201 and the second voltage output circuit 202.

The collector "c" and the emitter "e" of the transistor Q1 of the first voltage output circuit 201 is connected, at same time, the first diode D1 connected between the first voltage output circuit 201 and the second voltage output circuit 202 is enabled. The output terminal OUTPUT of the first voltage output circuit 201 outputs a high level signal to the power terminal of the corresponding electronic device. Then, the positively enabled tristate buffer U4 of the second voltage output circuit 202 is enabled. The transistor Q1 of the second voltage output circuit 202 is enabled at a high level signal outputted from the second NOR gate U3. The output terminal OUTPUT of the second voltage output circuit 202 outputs a high level signal to the power terminal of the corresponding electronic device. Consequently, the ith voltage output circuit 203 and the adjacent i+1th voltage output circuit 204 output a high level signal sequentially under the control of the voltage sequence output circuit 100.

It will be understood that particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A voltage sequence output circuit, comprising:
a sequence control circuit comprising a first NOR gate and a negatively enabled tristate buffer; the first NOR gate comprising a plurality of input terminal and an output terminal, and the negatively enabled tristate buffer comprising an input terminal coupled to a power source, a negatively enabled terminal coupled to the negative output terminal of the first NOR gate, and an output terminal; and a plurality of voltage output circuits each comprising an input terminal, an output terminal, and a positively enabled tristate buffer connected between the input terminal and the output terminal thereof; the input terminal of the voltage output circuit is coupled to the input terminal of the first NOR gate; the positively enabled tristate buffer comprising an input terminal, an output terminal, and a positively enabled terminal coupled to the output terminal of the negatively enabled tristate buffer;

wherein the positively enabled terminal of the positively enabled tristate buffer of the first voltage output circuit is coupled to the negative output terminal of the first NOR gate, the output terminal of the positively enabled tristate buffer of the ith (i≧1) voltage output circuit is coupled to the positively enabled terminal of the positively enabled tristate buffer of the adjacent i+1th voltage output circuit.

2. The voltage sequence output circuit in claim 1, further comprising a plurality of first diodes, and the anode of one first diodes being coupled to the negative output terminal of the first NOR gate, and the cathode of this first diode being coupled to the positively enabled terminal of the positively enabled tristate buffer of the first voltage output circuit; the anode of another first diodes being connected to the output terminal of the positively enabled tristate buffer of the ith voltage output circuit, and the cathode of this first diodes being connected to the positively enabled terminal of the positively enabled tristate buffer of the adjacent i+1th voltage output circuit.

3. The voltage sequence output circuit in claim 1, wherein each of the voltage output circuits further comprises a second NOR gate, a first resistor, and a transistor; the second NOR gate comprises a first input terminal coupled to the input terminal of the voltage output circuit, a second input terminal being grounded, and a negatively enabled terminal; the first resistor is connected between the first input terminal of the second NOR gate and the power source; the input terminal of the positively enabled tristate buffer is coupled to the negative output terminal of the second NOR gate; the output terminal of the positively enabled tristate buffer is coupled to the base of the transistor; the collector of the transistor is coupled to the power source; the emitter of the transistor is coupled to the output terminal of the voltage output circuit.

4. The voltage sequence output circuit in claim 3, wherein the voltage output circuit further comprises a second diode, the second diode comprises an anode coupled to the output terminal of the negatively enabled tristate buffer, and a cathode coupled to the positively enabled terminal of the positively enabled tristate buffer.

5. The voltage sequence output circuit in claim 3, wherein the voltage output circuit further comprises a second resistor; the second resistor is connected between the emitter of the transistor and the output terminal of the voltage output circuit.

6. The voltage sequence output circuit in claim 3, wherein the transistor is an NPN type.

7. The voltage sequence output circuit in claim 1, wherein the input terminals of the first NOR gate is balanced by the voltage output circuits.

* * * * *